US012777518B2

(12) United States Patent
Maso et al.

(10) Patent No.: US 12,777,518 B2
(45) Date of Patent: Oct. 27, 2026

(54) SIGNALLING IN A RADIO ACCESS NETWORK

(71) Applicant: Nokia Technologies Oy, Espoo (FI)

(72) Inventors: Marco Maso, Massy (FR); Axel Mueller, Massy (FR); Nhat-Quang Nhan, Massy (FR); Karri Markus Ranta-Aho, Espoo (FI); Amir Mehdi Ahmadian Tehrani, Munich (DE)

(73) Assignee: Nokia Technologies Oy, Espoo (FI)

( * ) Notice: Subject to any disclaimer, the term of this patent is extended or adjusted under 35 U.S.C. 154(b) by 386 days.

(21) Appl. No.: 18/547,261

(22) PCT Filed: Mar. 10, 2022

(86) PCT No.: PCT/FI2022/050151
§ 371 (c)(1),
(2) Date: Aug. 21, 2023

(87) PCT Pub. No.: WO2022/207968
PCT Pub. Date: Oct. 6, 2022

(65) Prior Publication Data
US 2024/0147523 A1 May 2, 2024

(30) Foreign Application Priority Data
Mar. 29, 2021 (FI) ..................................... 20215366

(51) Int. Cl.
*H04W 74/00* (2009.01)
*H04W 74/0833* (2024.01)
*H04W 80/02* (2009.01)

(52) U.S. Cl.
CPC ..... *H04W 74/006* (2013.01); *H04W 74/0833* (2013.01); *H04W 80/02* (2013.01)

(58) Field of Classification Search
CPC ........... H04W 74/006; H04W 74/0833; H04W 80/02; H04L 1/08
See application file for complete search history.

(56) References Cited

U.S. PATENT DOCUMENTS

2014/0348042 A1 11/2014 Gruet et al.
2019/0159197 A1 5/2019 Shrestha et al.
(Continued)

FOREIGN PATENT DOCUMENTS

CN 105594285 B 6/2019
WO 2010/087569 A1 8/2010
(Continued)

OTHER PUBLICATIONS

Analysis of LTE-A Random Access Procedure: A Foundation to Propose Mechanisms for Managing the M2M Massive Acc (Year: 2019).*
(Continued)

*Primary Examiner* — Joseph E Avellino
*Assistant Examiner* — Anindita Sen
(74) *Attorney, Agent, or Firm* — Lippes Mathias LLP

(57) ABSTRACT

Certain examples of the present disclosure provide a User Equipment, UE, 110 configured to: receive an identifier 202, wherein the identifier is configured to signal control information and/or configuration information respectively for triggering performance of an action and/or configuring the UE 110; determine 203, based at least in part on the received identifier, the control information and/or the configuration information; and perform 204 the action and/or configure the UE 110 in accordance with the determined control and/or the determined configuration information.

16 Claims, 3 Drawing Sheets

(56) References Cited

U.S. PATENT DOCUMENTS

| | | | | |
|---|---|---|---|---|
| 2020/0037368 | A1 | 1/2020 | Hoglund et al. | |
| 2021/0051707 | A1 | 2/2021 | Rastegardoost et al. | |
| 2021/0076384 | A1 | 3/2021 | MolavianJazi et al. | |
| 2021/0084689 | A1* | 3/2021 | Ly | H04L 5/0044 |
| 2021/0329704 | A1* | 10/2021 | Yang | H04L 5/001 |
| 2022/0007431 | A1* | 1/2022 | Qiu | H04B 7/1851 |
| 2022/0191819 | A1* | 6/2022 | Ratasuk | H04W 8/12 |
| 2022/0330324 | A1* | 10/2022 | Vejlgaard | G01S 7/021 |
| 2022/0337472 | A1* | 10/2022 | Turtinen | H04B 7/0408 |

FOREIGN PATENT DOCUMENTS

| | | | |
|---|---|---|---|
| WO | 2019/216818 | A1 | 11/2019 |
| WO | 2020/032618 | A1 | 2/2020 |
| WO | 2020/032745 | A1 | 2/2020 |
| WO | 2020/045861 | A1 | 3/2020 |
| WO | 2020/191766 | A1 | 10/2020 |

OTHER PUBLICATIONS www.eventhelix.com (Year: 2019).*

Extended European Search Report received for corresponding European Patent Application No. 22779210.8, dated Jan. 3, 2025, 10 pages.

"Type A PUSCH repetitions for Msg3 for coverage enhancements", 3GPP TSG RAN WG1 #104e, R1-2101627, Agenda: 8.8.3, NTT Docomo, Jan. 25-Feb. 5, 2021, 3 pages.

"3rd Generation Partnership Project; Technical Specification Group Radio Access Network; NR; Physical layer procedures for control (Release 16)", 3GPP TS 38.213, V16.4.0, Dec. 2020, pp. 1-181.

"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"Feature lead summary on support of Type A PUSCH repetitions for Msg3", 3GPP TSG RAN WG1 #104-e, R1-2102226, Agenda: 8.8.3, ZTE Corporation, Jan. 25-Feb. 5, 2021, pp. 1-78.

"Discussion on Type A PUSCH repetition for Msg3", 3GPP TSG RAN WG1 #104-e, R1-2100461, Agenda: 8.8.3, vivo, Jan. 25-Feb. 5, 2021, pp. 1-7.

"Discussion on support of Type A Pusch repetitions for Msg3", 3GPP TSG RAN WG1 #104-e, R1-2100099, Agenda: 8.8.3, ZTE Corporation, Jan. 25-Feb. 5, 2021, pp. 1-7.

"Type A PUSCH repetitions for Msg3", 3GPP TSG RAN WG1 #104-e, R1-2100176, Agenda: 8.8.3, OPPO, Jan. 25-Feb. 5, 2021, 4 pages.

Office action received for corresponding Finnish Patent Application No. 20215366, dated Sep. 16, 2021, 8 pages.

"Work Item on NR small data transmissions in INACTIVE state", 3GPP TSG RAN Meeting #93e, RP-212594, Agenda: 9.3.2.7, ZTE Corporation, Sep. 13-17, 2021, 5 pages.

Office action received for corresponding Finnish Patent Application No. 20215366, dated Feb. 18, 2022, 7 pages. .

International Search Report and Written Opinion received for corresponding Patent Cooperation Treaty Application No. PCT/FI2022/050151, dated Jun. 13, 2022, 12 pages.

* cited by examiner

SIGNALLING IN A RADIO ACCESS NETWORK

RELATED APPLICATION

This application was originally filed as PCT Application No. PCT/FI2022/050151, filed on Mar. 10, 2022, which claims priority from FI application No. 20215366, filed on Mar. 29, 2021, each of which is incorporated herein by reference in its entirety.

TECHNOLOGICAL FIELD

Examples of the present disclosure relate to signalling in a radio access network. Some examples, though without prejudice to the foregoing, relate to controlling or configuring repetition of a Message 3 (Msg3) transmitted by a User Equipment, UE, in Uplink, UL, during a Random Access Channel, RACH, procedure.

BACKGROUND

Message 2 (Msg2) is a signal transmitted in downlink, DL, during a RACH procedure. Msg2 enables a radio access node, i.e., gNB, to provide configuration information to a UE enabling the UE to transmit a Msg3 signal over a Physical Uplink Shared Channel, PUSCH.

UL grants for Msg3 transmission in New Radio (NR) are currently conveyed via Msg2 over a Physical Downlink Shared Channel, PDSCH, scheduled by Downlink Control Information, DCI, 1_0, during the RACH procedure.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

Currently, (i.e., with respect to the 3rd Generation Partnership Project, 3GPP, Release 15 and Release 16) Msg3 repetitions by a User Equipment, UE, are not supported. In some circumstances it can be desirable to support repeated transmissions of Msg3. This may increase reliability and coverage of reception of Msg3. It may also help reduce latency by avoiding needing to restart a RACH procedure if there were an issue the gNB receiving an initially transmitted Msg3. In some circumstances it can be desirable to trigger and/or configure Msg3 repetitions by a UE in an efficient manner with minimal overhead and minimal additional signalling. In some circumstances it can be desirable to trigger and/or configure Msg3 repetitions by a UE in a manner with minimal impact on legacy UE (i.e., with 3GPP Release 15 and/or Release 16 operation).

The scope of protection sought for various embodiments of the invention is set out by the claims.

Any features described in this specification that do not fall under the scope of the claims are to be interpreted as examples useful for understanding various embodiments of the invention.

According to at least some examples of the disclosure there is provided a User Equipment, UE, configured to:

- receive an identifier, wherein the identifier is configured to signal control information and/or configuration information respectively for triggering performance of an action and/or configuring the UE;
- determine, based at least in part on the received identifier, the control information and/or the configuration information; and
- perform the action and/or configure the UE in accordance with the determined control and/or the determined configuration information.

According to various, but not necessarily all, examples of the disclosure there is provided a method for a User Equipment, UE, the method comprising:

- receiving an identifier, wherein the identifier is configured to signal control information and/or configuration information respectively for triggering performance of an action and/or configuring the UE;
- determining, based at least in part on the received identifier, the control information and/or the configuration information; and
- performing the action and/or configure the UE in accordance with the determined control and/or the determined configuration information.

According to various, but not necessarily all, examples of the disclosure there is provided computer program instructions for causing a User Equipment, UE, to perform:

- receiving an identifier, wherein the identifier is configured to signal control information and/or configuration information respectively for triggering performance of an action and/or configuring the UE;
- determining, based at least in part on the received identifier, the control information and/or the configuration information; and
- performing the action and/or configure the UE in accordance with the determined control and/or the determined configuration information.

According to various, but not necessarily all, examples of the disclosure there is provided a User Equipment, UE, comprising:

- at least one processor; and
- at least one memory including computer program instructions;
- the at least one memory and the computer program instructions configured to, with the at least one processor, cause the UE at least to perform:
- receiving an identifier, wherein the identifier is configured to signal control information and/or configuration information respectively for triggering performance of an action and/or configuring the UE;
- determining, based at least in part on the received identifier, the control information and/or the configuration information; and
- performing the action and/or configure the UE in accordance with the determined control and/or the determined configuration information.

According to various, but not necessarily all, examples of the disclosure there is provided a non-transitory computer readable medium encoded with instructions that, when performed by at least one processor, causes at least the following to be performed:

- receive an identifier, wherein the identifier is configured to signal control information and/or configuration information respectively for triggering performance of an action and/or configuring the UE;
- determine, based at least in part on the received identifier, the control information and/or the configuration information; and perform the action and/or configure the UE in accordance with the determined control and/or the determined configuration information.

According to various, but not necessarily all, examples of the disclosure there is provided a chipset comprising processing circuitry configured to perform the above-mentioned method.

According to at least some examples of the disclosure there is provided an apparatus configured to:

generate an identifier for a UE, wherein the identifier is configured to signal control information and/or configuration information respectively for triggering performance of an action and/or configuring the UE; and cause sending of the identifier to the UE.

According to various, but not necessarily all, examples of the disclosure there is provided a method comprising:

generating an identifier for a UE, wherein the identifier is configured to signal control information and/or configuration information respectively for triggering performance of an action and/or configuring the UE; and causing sending of the identifier to the UE.

According to various, but not necessarily all, examples of the disclosure there is provided computer program instructions for causing an apparatus to perform generating an identifier for a UE, wherein the identifier is configured to signal control information and/or configuration information respectively for triggering performance of an action and/or configuring the UE; and causing sending of the identifier to the UE.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

generating an identifier for a UE, wherein the identifier is configured to signal control information and/or configuration information respectively for triggering performance of an action and/or configuring the UE; and causing sending of the identifier to the UE.

According to various, but not necessarily all, examples of the disclosure there is provided a non-transitory computer readable medium encoded with instructions that, when performed by at least one processor, causes at least the following to be performed:

generate an identifier for a UE, wherein the identifier is configured to signal control information and/or configuration information respectively for triggering performance of an action and/or configuring the UE; and cause sending of the identifier to the UE.

The following portion of this 'Brief Summary' section describes various features that can be features of any of the examples described in the foregoing portion of the 'Brief Summary' section. The description of a function should additionally be considered to also disclose any means suitable for performing that function.

In some but not necessarily all examples, the control information and/or configuration information comprises, at least one selected from the group of:

information for triggering and/or configuring transmission of a message of a Random Access procedure;

information for triggering and/or configuring a number of repetitions of a message of a Random Access procedure;

information for triggering the UE to transmit a message a number of times; information for configuring the UE to transmit a message a number of times; and information for indicating a number of times a message is to be transmitted.

In some but not necessarily all examples, the message is a Msg3 message.

In some but not necessarily all examples, the identifier comprises at least one selected from the group of:

a temporary identifier, an identifier received in a message of a random access procedure, an identifier received in a Medium Access Control Protocol Data Unit, MAC PDU; and an identifier received in a Medium Access Control Random Access Response, MAC RAR.

In some but not necessarily all examples, the identifier is a Temporary Cell Radio Network Temporary Identifier, TC-RNTI.

In some but not necessarily all examples, the received identifier encodes an indication of the control information and/or the configuration information, and wherein the UE is configured to:

decode the received identifier to extract the indication of the control information and/or the configuration information.

In some but not necessarily all examples, at least a part of the received identifier is associated with the control information and/or the configuration information, and wherein the UE is configured to:

determine or receive association information for enabling the UE to determine the control information and/or the configuration information associated with the at least part of the received identifier.

In some but not necessarily all examples, the received identifier comprises an identifier value associated with one or more of a plurality of sets of identifier values, and wherein the UE is configured to:

determine or receive association information for enabling the UE to determine which set of identifier values the received identifier value is associated with.

In some but not necessarily all examples, each of the plurality of sets of identifier values is respectively associated with control information and/or configuration information, and wherein the UE is configured to:

determine or receive association information for enabling the UE to determine which set of identifier values are associated with which differing control information and/or configuration information.

In some but not necessarily all examples, the received identifier comprises a bit sequence, and wherein the UE is configured to:

determine, based on a subset of bits of the bit sequence of the received identifier, the control information and/or the configuration information.

In some but not necessarily all examples, each of the subset of bits of the identifier is associated with differing control information and/or configuration information, and wherein the UE is configured to:

determine or receive association information for enabling the UE to determine which subset of bits of the bit sequence of the identifier are associated with which differing control information and/or configuration information.

In some but not necessarily all examples, the association information is, at least one selected from the group of:

pre-stored in a memory of the UE;

received in a message;

received in System Information, SI; and received in Downlink Control Information, DCI.

In some but not necessarily all examples, the UE is further configured to:

check for receipt of an indicator; and determine the control information and/or the configuration information in dependence upon receipt of the indicator.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

According to various, but not necessarily all, examples of the disclosure there are provided examples as claimed in the appended claims.

BRIEF DESCRIPTION OF THE DRAWINGS

Some examples will now be described with reference to the accompanying drawings in which.

Figure 1:
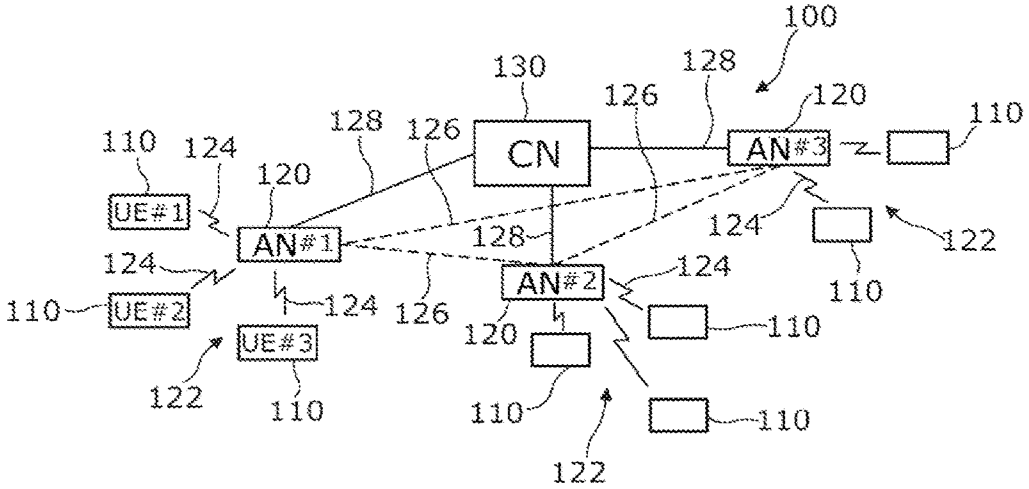
FIG. 1 shows an example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature is referenced by the same three digit number. In the drawings (and description), an optional subscript to the three digit number can be used to differentiate different instances of similar features. Therefore, a three digit number without a subscript can be used as a generic reference and the three digit number with a subscript can be used as a specific reference. A subscript can comprise a single digit that labels different instances. A subscript can comprise two digits including a first digit that labels a group of instances and a second digit that labels different instances in the group.

ABBREVIATIONS/DEFINITIONS

CBRA Contention Based Random Access
CE Coverage Enhanced
CRC Cyclic Redundancy Check
CSI Channel State Information
CSI-RS Channel State Information Reference Signal
DCI Downlink Control Information
DL Downlink
gNB gNodeB
LSB Least Significant Bits
MAC Medium Access Control
MCS Modulation and Coding Scheme
MSB Most Significant Bits
NR New Radio
PDSCH Physical Downlink Shared Channel
PDU Protocol Data Unit
PUCCH Physical Uplink Control Channel
PUSCH Physical Uplink Shared Channel
RACH Random Access Channel
RAPID Random Access Preamble ID
RAR Random Access Response
RA-RNTI Random Access—Radio Network Temporary Identifier
RMSI Remaining System Information
RRC Radio Resource Control
RSRP Reference Signal Received Power
SI System Information
SIB System Information Block
SLIV Start and Length Indicator Value
TA Timing Advance
TBS Transport Block Size
TC-RNTI Temporary Cell—Radio Network Temporary Identifier
TDD Time-Division Duplexing
TPC Transmitter Power Control
UE User Equipment
UL Uplink

DETAILED DESCRIPTION

FIG. 1 schematically illustrates an example of a network 100 comprising a plurality of network nodes including terminal nodes 110 (also referred to as User Equipment, UE), access nodes 120 and one or more core nodes 130. The terminal nodes 110 and access nodes 120 communicate with each other. The access nodes 120 communicate with the one or more core nodes 130. The one or more core nodes 130 may, in some but not necessarily all examples, communicate with each other. The one or more access nodes 120 may, in some but not necessarily all examples, communicate with each other.

The network 100 is in this example a radio telecommunications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility Management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands, not least such as a 60 GHz unlicensed band where beamforming is mandatory in order to achieve required coverage.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e., Multi Radio Access Technology—Dual Connection (MR-DC), not least for example such as:

- Evolved Universal Terrestrial Radio Access—New Radio Dual Connectivity (EUTRA-NR-DC, also referred to as EN-DC),
- New Radio—Evolved Universal Terrestrial Radio Access Dual Connectivity (NR-EUTRA-DC, also referred to as NE-DC), Next Generation Radio Access Network Evolved Universal Terrestrial Radio
- Access—New Radio Dual Connectivity (NG-RAN E-UTRA-NR Dual Connectivity, also referred to as NGEN-DC), or
- New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node 120 can be implemented as a single network equipment, or disaggregated/distributed over two or more RAN nodes, such as a central unit (CU), a distributed unit (DU), a remote radio head-end (RRH), using different functional-split architectures and different interfaces.

In the following description, an access node will be referred to as gNB 120 and a terminal node 110 will be referred to as a UE 110.

Figure 2:
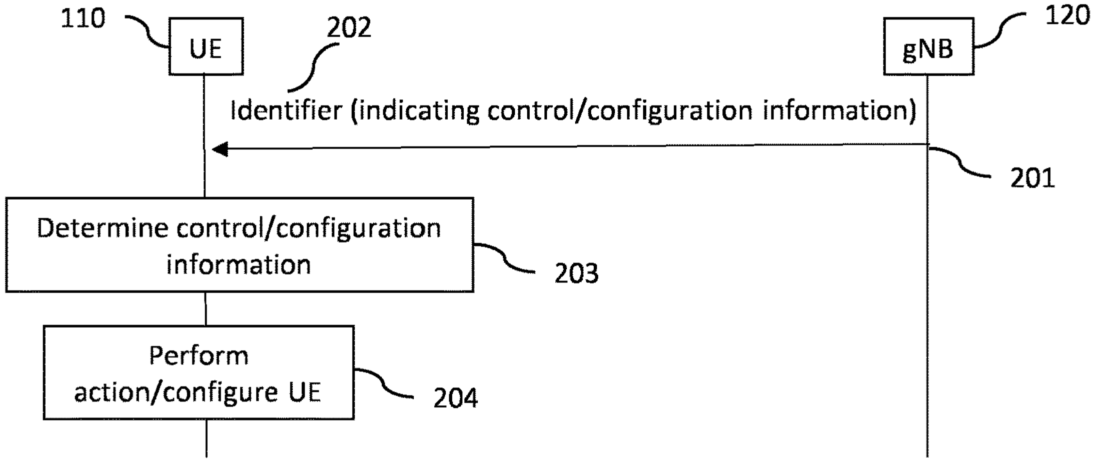
FIG. 2 shows another example of the subject matter described herein.

FIG. 2 is a diagram illustrating signaling between a gNB 120 and UE 110.

The gNB 120 signals to the UE 110, via a message 201, an identifier 202 for the UE. The identifier 202 is configured so as to serve to provide an identity of the UE. The identifier is further configured to signal control information and/or configuration information for the UE. The control information is configured to trigger the UE to perform a particular action, whereas the configuration information is configured to configure the UE, e.g., to perform a particular action (wherein the performance of the action can be separately triggered, e.g., via a separate message, or via the control information).

As illustrated by block 203, the UE 110 determines, based at least in part on the received identifier 202, the control information and/or the configuration information.

As illustrated by block 204, the UE 110 performs the action and/or configures itself in accordance with the determined control and/or the determined configuration information.

By way of illustration, the following is a non-limiting example of a specific implementation of an example of the present disclosure. In this example, an action, namely Type A Msg3 repetitions, can be triggered and/or configured via an identifier, namely a Temporary Cell Radio Network Temporary Identifier, TC-RNTI. The Type A Msg3 repetition may mean repetition of slots (which may or may not be fully filled with a msg3 allocation). In other examples, differing types of Msg3 repetitions can be triggered and/or configured, not least such as Type B Msg3 repetitions. The Type B Msg3 repetition may mean repetition of msg3 allocation and not the slot containing the Msg3. Type B Msg3 repetition may allow the msg3 to repeated within the same slot and even across slot boundaries.

In this example, a base station, gNB 120, selects a TC-RNTI value to be included in a UL grant given to a UE 110 in a Medium Access Control, MAC, Random Access Response, RAR. The gNB selects a particular value of the TC-RNTI in dependence on whether the UE is to be triggered or configured to perform Msg3 repetitions. In this regard, out of the pool of possible TC-RNTI values, 1 to 65519 (0x0001 to 0xFFEF), a subset of the values is pre-associated with triggering and/or configuring Msg3 repetitions. Accordingly, the gNB, by selecting a TC-RNTI value within the subset of TC-RNTI values can indicated that Msg3 repetitions are to be triggered and/or configured. The UE, upon receiving such a TC-RNTI value within the subset of TC-RNTI values, can then trigger/be configured to perform Msg3 repetitions.

In some examples, the identifier comprises, at least one selected from the group of:

- a temporary identifier;
- an identifier received in a message (e.g., Message 2, Msg2) of a random access procedure (such as a RACH procedure and/or CBRA procedure);
- an identifier received in a Medium Access Control Protocol Data Unit, MAC PDU;
- an identifier received in a Medium Access Control Random Access Response, MAC RAR; and
- a Temporary Cell Radio Network Temporary Identifier, TC-RNTI.

As will be discussed further below, the identifier may be configured so that, in addition to serving to provide an identify to the UE, it also conveys/indicates/encodes/implicitly signals control information and/or configuration information for the UE.

In some examples, the control information and/or configuration information comprises, at least one selected from the group of:

information for triggering and/or configuring transmission of a message of a Random Access procedure (such as a RACH procedure and a Contention Based Random Access, CBRA, procedure);

information for triggering and/or configuring a number of repetitions of a message of a Random Access procedure;

information for triggering the UE to transmit a message a number of times; information for configuring the UE to transmit a message a number of times; and information for indicating a number of times a message is to be transmitted.

In some examples, the above-mentioned message is a Message 3, Msg3, of a Random Access procedure, such as a 4 step RACH procedure/CBRA procedure.

In some examples, actions other than repetition/no repetition of a message transmission may be triggered and/or configured. For instance, the control and/or configuration information may be for triggering and/or configuring the performance of effecting a power boost/no power boost in a transmitted signal, such as a Msg3.

In some examples, wherein the control information and/or the configuration information is signalled in the received identifier via the received identifier encoding an indication of the control information and/or the configuration information, the UE decodes the encoded received identifier to extract the indication of the control information and/or the configuration information.

In some examples, at least a part of the received identifier is associated with the control information and/or the configuration information. In this regard, at least part of the received identifier (such as for example, where the identifier is a bitstring, a sequence of bits of the bitstring) may be mapped to or pre-associated with the control information and/or the configuration information. Such pre-mapping/pre-associated may be done by the gNB as will be discussed in further detail below. The UE determines or receives the association information (e.g., the mapping of a particular sequence of bits to particular control and/or configuration information) for enabling the UE to determine the control information and/or the configuration information associated with the at least part of the received identifier.

In some examples the association information is, at least one selected from the group of:

pre-stored in a memory of the UE (i.e., association could be specified in a standard and/or coded in a specification. The association information could comprise a codebook stored in a memory of the UE. In such examples, the UE's determination of the association information could comprise the UE retrieving it from a memory);

received in a message (e.g., a configuration message). The configuration message may any one of a System Information, SI, message or a Downlink Control Information, DCI message. For example, the configuration message could be a dedicated configuration message for providing the UE with the association information);

received in System Information, SI (e.g., via higher-layer signaling such as SIB1 or RMSI); and received in Downlink Control Information, DCI.

In some examples, the received identifier comprises an identifier value associated with one or more of a plurality of sets of identifier values, and the UE determines or receives association information for enabling the UE to determine which set of identifier values the received identifier value is associated with. In some examples, each of the plurality of sets of identifier values is respectively associated with control information and/or configuration information, and the UE determines or receives association information for enabling the UE to determine which set of identifier values are associated with which differing control information and/or configuration information. By way of a simplified example, if the identifier were a TC-RNTI, the identifier can have a value that goes from 1 to 65519 [0x0001 to 0xFFEF]. In this simplified example, a first set of identifier values is pre-defined as values ranging from 1 to 31759 and a second set of identifier values is pre-defined as values ranging from 31760 to 65519. Moreover, the first set of identifier values is pre-associated with control information to trigger repeated transmission of Msg3, whereas the second set of identifier values is pre-associated with control information to trigger only a single transmission of Msg3. The UE can determine (e.g., look up in a pre-determined codebook pre-stored in a memory of the UE) or receive (e.g., in a received message) association information that associates values ranges with the first set (i.e., thereby defining the first set by specifying the ranges of values, 1 to 31759, that constitute the first set) and associates value ranges with the second set (i.e., thereby defining the second set by specifying the ranges of values, 31760 to 65519, that constitute the second set).

The UE can also determine (e.g., look up in a pre-determined codebook pre-stored in a memory of the UE) or receive (e.g., in a received message) association information that associates each set with a particular action to be triggered, e.g., associating the first set with triggering repeated transmission of Msg3, and the second set with triggering just a single transmission of Msg3. Hence, if the UE were to receive an identifier value 12345, it could determine that it has received an identifier from the first set. Moreover, the UE could determine that the first set is associated with triggering repeated transmission of Msg3. Hence, the receipt of the identifier 12345 can trigger the UE to perform repeated transmissions of Msg3. In such a manner, a gNB, which generates and sends the identifier to the UE, can generate and select a value of the identifier, i.e., from an available pool of identifiers from either the first set or second set, depending on whether the gNB wishes to receive from the UE either repeated transmissions of Msg3 (for improved coverage and/or reliability, e.g., where channel conditions are poor) or a single transmission of Msg3 (to save resource, reduce latency, increase network capacity e.g., where channel conditions are good). In such a manner the gNB can control the UE's repeated transmissions of Msg3. Significantly, since the control information is encoded in a conventional TC-RNTI, i.e., the TC-RNTI still adapts a number from 1 to 65519 for identifying the UE in the RACH procedure, if a legacy UE (i.e., one not configured and/or able to decode the TC-RNTI to extract control/configuration information therefrom) were to receive such an "encoded" TC-RNTI, it could still use the TC-RNTI in the conventional manner to carry out the conventional RACH procedure.

Advantageously, various examples of the disclosure may thereby provide a new signaling framework that allows a gNB to trigger and/or configure Msg3 repetitions to duly configured UEs (referred to herein as Coverage Enhanced, CE, UEs, as compared to legacy UEs without the capability of extracting the triggering and/or configuration information from the identifier). Moreover, advantageously, operations at legacy UEs are kept unchanged, since the signaling framework and its related method are fully transparent to legacy UEs. Various examples may thereby enable control of Msg3 repetitions without enforcing any non-negligible trade-off in terms of performance or backward compatibility.

In effect, in various examples of the invention, the previously fully open/random choice of TC-RNTI (i.e., any value from 1 to 65519) is constrained, in order for the TC-RNTI to carry additional information (e.g., regarding triggering or configuring the UE to perform repeated transmissions of Msg3). This additional meaning of the TC-RNTI is only visible to UEs that support CE. Legacy UEs are simply not aware of the "presence" of the additional information and behave as before.

It will be appreciated that an identifier value can be expressed as a bitstring. Accordingly, rather than associating one or more sets of values with control information and/or configuration information, instead one or more bit sequences of the bitstring could be associated with control information and/or configuration information.

In various examples, the UE determines, based on a subset of bits of the bit sequence of the received identifier, the control information and/or the configuration information.

In some examples, the received identifier comprises a bit sequence, and the UE determines, based on a subset of bits of the received identifier, the control information and/or the configuration information.

In some examples, each of the subset of bits of the identifier is associated with differing control information and/or configuration information, and the UE determines or receives association information for enabling the UE to determine which subset of bits of the identifier are associated with which differing control information and/or configuration information.

In some examples the UE checks for receipt of an indicator and whether or not the UE determines the control information and/or the configuration information is based, at least in part upon receipt of the indicator. The indicator may indicate to the UE whether it should expect the identifier to encode control and/or configuration information and hence whether the UE ought to attempt to extract the control and/or configuration information and implement the same. For example, the gNB could send the UE an indicator that informs the UE whether or not the gNB supports triggering/configuring of Msg3 repetitions via TC-RNTI. The UE could thereby check, via the indicator, if the gNB supports such repetitions before considering that the TC-RNTI is used to provide information on the Msg3 repetition configuration. The indicator could be a flag or a dedicated message that serves to inform the UE that the encoded identifier feature/functionality is active in the cell currently serving the UE. In some examples, the receipt of association information, e.g., presence of association information in an SI (such as information elements (IEs), e.g., SIB1 or RMSI, received via higher-signaling), in itself can act as the indicator. Moreover, any configuration information related to the association information can act as an implicit indicator. Such a checking step may avoid issues with legacy gNBs (e.g., Rel-16 gNBs that do not support the conveying of triggering and/or configuring information for Msg3 repetition via TC-RNTI), which could produce unwanted emissions and interference from the UE.

Figure 3:
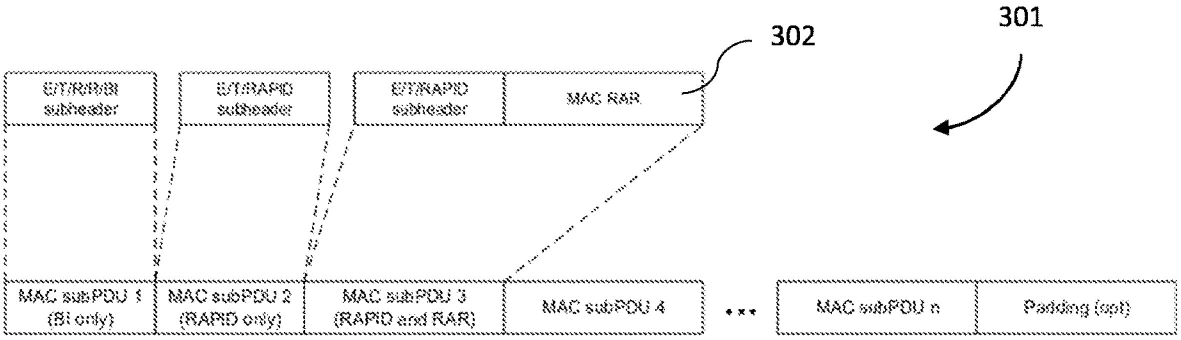
FIG. 3 shows another example of the subject matter described herein.

FIG. 3 shown an example of a MAC PDU 301 contained in a Msg2 of a RACH procedure.

Msg2 is a signal transmitted in DL during the RACH procedure, by means of which a gNB provides to UE useful information to be used for configuring and transmission of Msg3 over the PUSCH. Msg2 typically contains a MAC PDU 301, which in turn consists of one or more MAC subPDUs. Whenever the size of the MAC PDU does not coincide with a valid Transport Block Size, TBS, value, resulting from the amount of resources scheduled by the gNB for transmitting Msg2, a padding is added at the end of the MAC PDU. In other words, presence and length of padding is implicit based on both TBS and size of MAC subPDU(s). In general, each MAC subPDU consists of one of the following:

- a MAC subheader with Backoff Indicator only;
- a MAC subheader with Random Access Preamble ID, RAPID, only (i.e., acknowledgment for SI request);
- a MAC subheader with RAPID and MAC RAR 302.

Different combinations of the above subPDU instances can occur in a MAC PDU, as shown in FIG. 3.

At least one MAC subheader with RAPID and MAC RAR 302 must be included in the MAC PDU during access for the UE to be able to configure and perform Msg3 transmission. A 'MAC subPDU(s) with RAPID and MAC RAR' can be placed anywhere between MAC subPDU with Backoff Indicator only (if any) and padding (if any).

Figure 4:
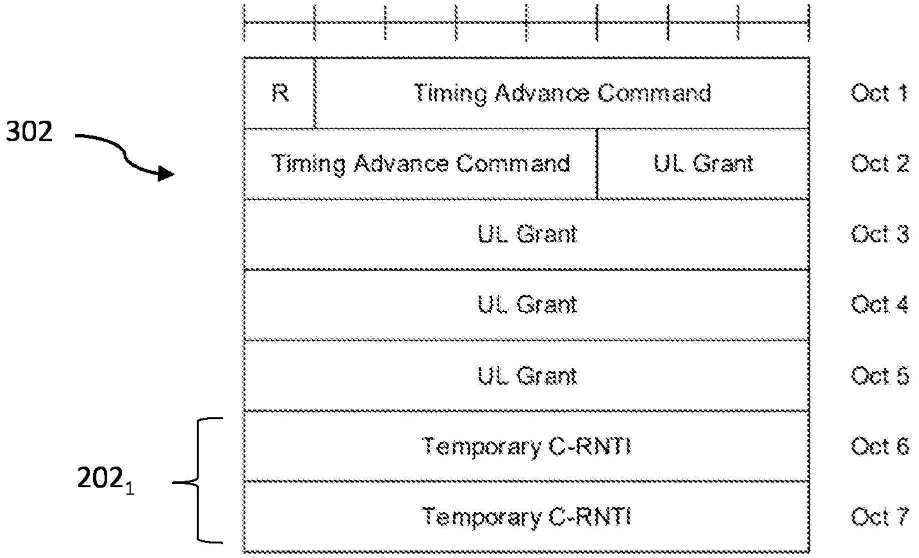
FIG. 4 shows another example of the subject matter described herein.

FIG. 4 shows an example of a MAC RAR 302. The MAC RAR 302 is of fixed size and consists of the following fields:

- R is a Reserved bit, set to "0";
- Timing Advance Command is a 12-bit field indicating an index value Timing
- Advance, TA, used to control the amount of timing adjustment that the UE must apply for UL frame transmission.
- UL Grant is a 27-bit field indicating the resources to be used on the uplink, whose content is summarized in the below table;
- Temporary C-RNTI, TC-RNTI, is a 16-bit field indicating a temporary identity which the UE should use for scrambling a Cyclic Redundancy Check, CRC, of the Msg3 transmitted over the resources scheduled by the UL grant. TC-RNTI's range of values goes from 1 to 65519 (0x0001 to 0xFFEF).

| RAR grant field (the 27-bit UL grant in MAC RAR) | Number of bits |
|---|---|
| Frequency hopping flag | 1 |
| Msg3 PUSCH frequency resource allocation | 14 |
| Msg3 PUSCH time resource allocation | 4 |
| Modulation and Coding Scheme, MCS | 4 |
| Transmitter Power Control, TPC, command for Msg3 PUSH | 3 |
| Channel State Information, CSI, request | 1 |

wherein "CSI request" is a reserved bit during Contention Based Random Access, CBRA.

Upon decoding Msg2, the UE uses the received TC-RNTI for scrambling Msg3's CRC (PUSCH corresponding to RAR grant) and for its future retransmissions in the uplink, if any. If the gNB were to fail to decode Msg3, the gNB would send a grant (DCI format 0_0) to the UE which is addressed to TC-RNTI. Accordingly, the TC-RNTI serves the purpose of an identity/signature used to address the UE prior to RRC connection establishment, during CBRA procedure.

Moreover, after Msg3's reception at gNB, the TC-RNTI is also used to scramble the CRC of a subsequent PDCCH (DCI format 1_0) which scrambles the PDSCH over which a UE Contention Resolution (UE Contention Resolution Identity MAC Control Element) is sent to the UE. The TC-RNTI is then promoted to C-RNTI for a UE which wins a contention and does not already have a C-RNTI. The TC-RNTI is dropped by the other UEs (for which contention is not successful).

3GPP Rel-15 and Rel-16 do not support Msg3 repetitions. UL grants for Msg3 transmission in NR are currently conveyed in a Msg2 sent via PDSCH scheduled by DCI 1_0, during RACH procedure. For this reason, existing scheduling solutions for PUSCH repetitions cannot be reused, i.e., via DCI 0_0/0_1/0_2.

Examples of the present disclosure provide a new solution to provide the necessary support to Msg3 repetitions in NR (as per a currently ongoing 3GPP Rel-17 Work Item Description, WID). Furthermore, examples also achieve the same and provide such functionality with minimal (or zero) impact on legacy UE (Rel-15/16) operation, where legacy UEs not supporting the functionality can work in the system without the gNB needing to know in advance whether the UE attempting a random access procedure is a new UE supporting the functionality or a legacy UE not supporting the functionality.

In various examples of the present disclosure, a specific set of values of TC-RNTI (included in each UL grant, which is in turn carried by MAC RAR) are used to at least trigger and/or configure Msg3 repetitions for the UE whose RAPID is included as sub-header of the MAC RAR. The set of values may or may not be a continuous range of values.

In essence, the previously fully open/random choice/selection of TC-RNTI (with values ranging from 1 to 65519 (0x0001 to 0xFFEF)), is constrained in order to enable the TC-RNTI to carry additional information. The additional meaning of a particular TC-RNTI value is only 'visible' to UEs that support such functionality—referred to as Coverage Enhanced, CE, UEs. Legacy UEs are not aware of the "presence" of the additional information and behave, unaffected, as before.

Various examples of the disclosure may enable the following design goals to be met, without enforcing any non-negligible trade-off in terms of performance or backward compatibility:

- a new signaling framework created to allow a gNB to trigger and/or configure Msg3 repetitions to UEs (i.e., CE UEs), whenever needed.
- operations at legacy UEs (i.e., non-CE UEs) are kept unchanged, since the signaling framework introduced in this idea, and its related method, are fully transparent to legacy UEs.

In various examples, a specific logic is used by the gNB by which to decide/select the TC-RNTI(s) included in the MAC PDU (one per UL grant), depending on how different TC-RNTI value(s) among the 65519 available ones are mapped to specific Msg3-related signaling, e.g., triggering and/or configuring the UE to perform repeated Msg3 transmissions. Such implicit signalling could be used to simply trigger Msg3 repetitions, and/or also used to configure additional aspects of the Msg3 repetitions, e.g., number of repetitions. Advantageously, the gNB does not need to alter the structure or the size of the MAC PDU carried by Msg2, nor the DCI 1_0 (whose CRC is scrambled by the RA-RNTI, corresponding to the Random Access Occasion, RO, over which one or more preambles have been detected by gNB) used to schedule the PDSCH that carries Msg2. Advantageously, such functionality is thereby achieved with no impact on legacy UEs operations, nor on their performance. Furthermore, the present method could be used regardless of whether the gNB is aware of the capabilities of the UEs attempting access, i.e., whether or not the gNB is aware of whether the UE is a CE UE (that has the capability to support the convening of Msg3 repetition information conveyed via TC-RNTI) or a legacy UE.

Only CE UEs would be able to infer the additional meaning conveyed by the specific TC-RNTI values associated to Msg3-related signalling, whereas legacy UEs would keep operating as per Rel-15/Rel-16 specification. Indeed, all UEs would keep using their received TC-RNTI to scramble the CRC of Msg3 as per legacy RACH procedure, regardless of whether they are also using TC-RNTI to infer additional Msg3-related signalling. Hence, the signaling method of the present disclosure advantageously provides compatibility and full backward compatibility with current NR network operations and procedures.

The information on the aforementioned mapping between particular TC-RNTI value(s) and their corresponding Msg3-related meaning, could be made available at the UEs at least via such information being:

- hard-coded in the specification;
- signalled to the UE via higher-layer signaling, e.g., SIB1, RMSI; and/or dynamically/semi-statically indicated, e.g., via DCI.

In various examples of the disclosure provides a method to trigger and/or configure Msg3 repetitions, along with a suitable signaling structure used by the method itself, which can be added to the current network operations as per Rel-16.

The Msg3 repetition triggering and configuration method makes use of an existing field of the MAC RAR, e.g., the TC-RNTI, while establishing a relationship between specific instances of that field and Msg3-related signaling.

Advantageously, examples of the proposed method of the present disclosure do not require modifications to existing UL grant, nor an increase of number of UL grants carried by the MAC PDU. Examples of the proposed method do not enforce any new requirements on PDSCH capacity as compared to other UL grant based counterparts. Examples of the proposed method do not require modification to existing DCI 1_0 format, in terms of neither additional fields nor use of the existing fields. Examples of the method do not require any change to RA-RNTI number space or calculation. This ensures a much lower specification impact (i.e., null). This may be particularly beneficial given the significant role RA-RNTI has on the RO/SSB/DCI 1_0 mapping in the context of RACH.

Examples of the proposed method do not assume that specific conditions are met in the cell or at the UE side for being applied and used. In examples of the proposed method, the informative content of existing fields of the UL grant, such as MCS and TPC, is not reduced. Examples of the proposed method do not propose the existence of a Rel-17 grant among Rel-15/Rel-16 ones, differentiated using a reserved bit in the MAC RAR (e.g., 'IR' bit in the MAC RAR, or the reserved CSI request field of the UL grant in the MAC RAR).

Figure 5:
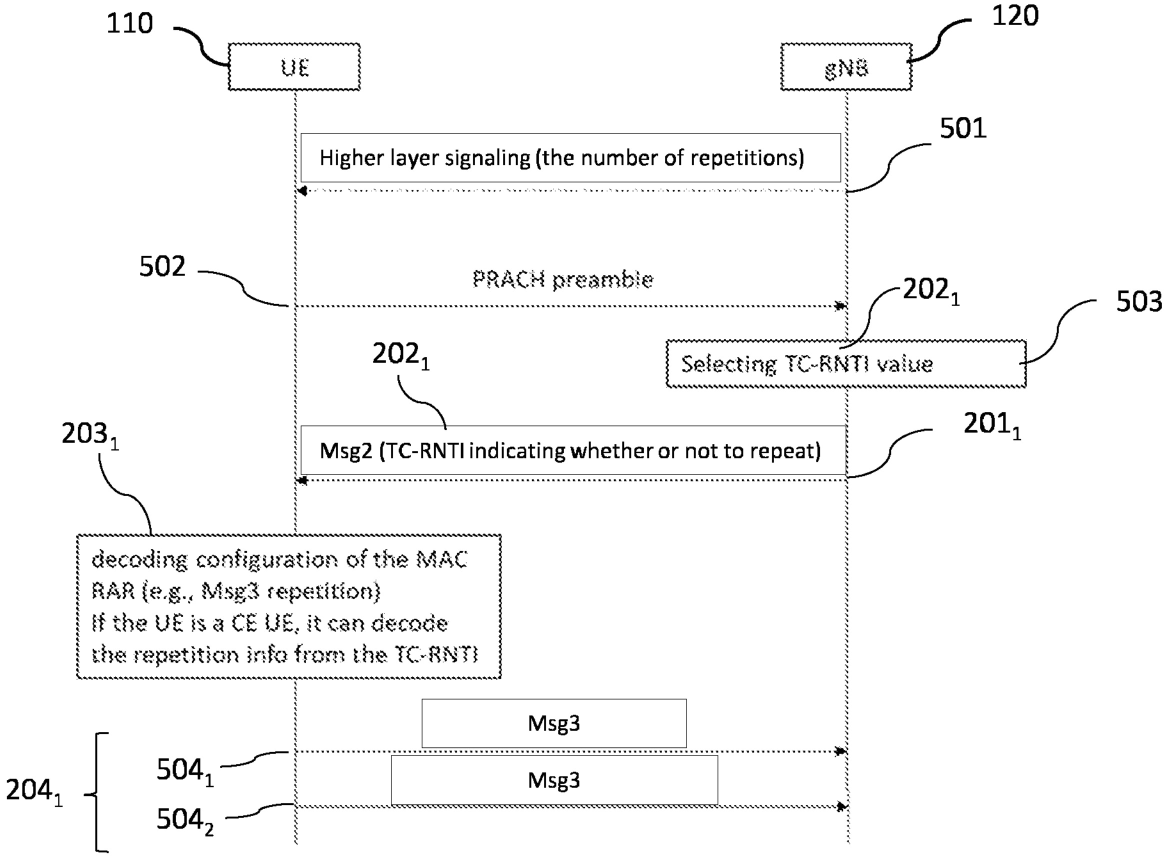
FIG. 5 shows another example of the subject matter described herein.

FIG. 5 is a signalling diagram illustrating an example of signalling, between a UE 110 and a gNB 120, that may be used in an example of the present disclosure.

The UE 110 signals a PRACH preamble 502 to the gNB 120.

The gNB may decide whether or not to trigger and/or configure Msg3 repetitions depending, for example, on whether one or more of the following conditions are met:

- the PRACH preamble implicitly carries a Msg3 repetition request or a capability indication; and the PRACH preamble is received with a Reference Signal Received Power, RSRP, lower than a threshold value (such a RSRP threshold could be implementation-dependent).

If the gNB decides to trigger and/or configure Msg3 repetitions, in block 503 the gNB then selects an appropriate TC-RNTI value $\mathbf{202}_1$ to be included in the payload of a Msg2 $\mathbf{201}_1$. The TC-RNTI is selected depending on whether it is used to trigger Msg3 repetitions and/or configure the number of Msg3 repetitions.

Block 503 may or may not also include a dynamic/semi-static indication (e.g., via DCI over broadcast PDCCH) to configure the mapping of TC-RNTI values to suitable configurations of Msg3 repetitions (e.g., related to triggering and/or number of repetitions). Such further signaling can be alternative to higher-layer signaling 501, or hard-coded configuration in specification.

The higher-layer signaling 501 may provide information on the mapping of TC-RNTI values to triggering and/or configuring Msg3 repetitions by the UE. It may comprise configuration options such as triggering and/or number of Msg3 repetitions. The higher-layer signaling may be provided via SIB1 or RMSI. The higher layer signalling can be omitted if the mapping information is hardcoded in the specification, or otherwise provided to the UE, e.g., via the above-mentioned dynamic/semi-static indication (e.g., via DCI over broadcast PDCCH. For instance, a semi-static indication could be provided by the DCI triggering and/or configuring the repetition which remains stays active until a new DCI [or something else] de-activates or changes it).

Once the TC-RNTI $\mathbf{202}_1$ has been selected, the gNB signals the Msg2 $\mathbf{201}_1$ (comprising the selected TC-RNTI $\mathbf{202}_1$ in its MAC RAR part) to the UE.

In block $\mathbf{203}_1$ the UE determines information, i.e., triggering and/or configurating information, based at least in part on the TC-RNTI $\mathbf{201}_1$. The UE decodes the information encoded in the TC-RNTI. The UE may determine whether Msg3 repetitions are triggered and/or a number of repetitions is configured based on the TC-RNTI provided by gNB, and on the mapping between TC-RNTI values and configurations related to Msg3 repetitions (such mapping information being either: hard coded, received via higher layer signalling or dynamically/semi-statically indicated e.g., via DCI).

UEs that have the capability to infer Msg3 triggering/configuration from TC-RNTI, i.e., CE UEs, are able to use the TC-RNTI also as implicit signaling related to Msg3 repetitions, whereas legacy UEs are not (though can continue to use the TC-RNTI in the conventional way, not least to scramble a CRC of the legacy UEs Msg3).

With reference to $\mathbf{204}_1$ the UE acts in accordance with the decoded triggering information and/or configuration information related to Msg3 repetitions. In this particular example, the UE (i.e., the CE UE) is triggered to perform Msg3 repetitions and hence the UE proceeds to perform such an action, i.e., repeatedly transmits its Msg3 504 for a number of times, i.e., $\mathbf{504}_1$ $\mathbf{504}_2$ (the number of repetition times may be encoded as configuration information in the TC-RNTI, or it may be: hard coded, received via higher layer signalling 501 or dynamically/semi-statically indicated e.g., via DCI).

Figure 6:
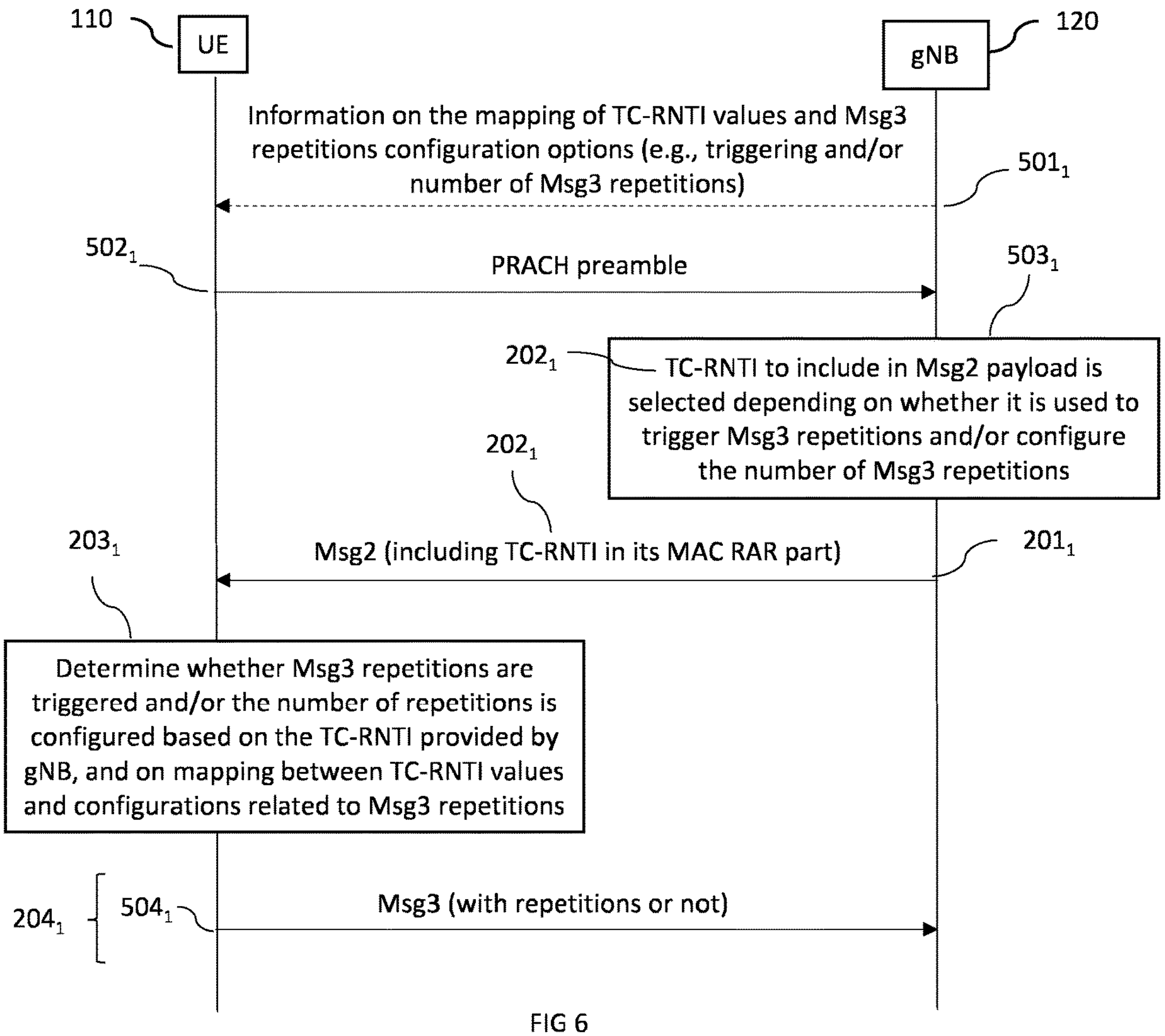
FIG. 6 shows another example of the subject matter described herein.

FIG. 6 is a signalling diagram illustrating a further example of signalling, between a UE 110 and a gNB 120, that may be used in an example of the present disclosure. The signalling and process blocks of FIG. 6 are similar to those of FIG. 5.

As with the above-described examples, the gNB 120 can select TC-RNTI values to be included in each UL grant, depending on whether gNB wants to, or shall, trigger and/or configure Msg3 repetitions to the recipient of the UL grant (i.e., the targeted UE(s) whose RAPID is used as sub-header of the MAC RAR).

Only CE UEs 110 would be able to interpret the implicit signalling conveyed by the gNB through its selected TC-RNTI, i.e., "decode" the trigger or configuration (or both) of Msg3 repetitions via TC-RNTI, whereas legacy UEs would operate with no modifications, e.g., with regards to Rel-15/Rel-16 operations.

Two possible implementations will now be described (it being appreciated that others are possible):

- use a set of TC-RNTI values to at least indicate that repetitions are triggered;
- use a set of TC-RNTI values to at least configure the number of Msg3 repetitions and achieve triggering thereof.

1. Use a Set of TC-RNTI Values to at Least Indicate that Repetitions are Triggered According to this implementation, a set of TC-RNTI values is used to at least indicate that repetitions are triggered. Other implicit signalling via TC-RNTI may take place together with the trigger. The set of TC-RNTI values, or multiple sub-sets of TC-RNTI values, may also be also used to configure the number of Msg3 repetitions (such configuration may also serve the purpose of trigger as well, or one or more bits of the TC-RNTI field can be used to trigger the repetitions).

The set of TC-RNTI values could be a range of contiguous TC-RNTI values.

The set of TC-RNTI values could be hard-coded in the specs. A non-limiting example, is provided in the below table, which shows a hard-coded set of TC-RNTI values with corresponding Msg3 repetition trigger state.

| Range of hard-coded TC-RNTI values | Msg3 repetition trigger state |
|---|---|
| $N_i$ to $N_j$ | ON |
| $N_l$ to $N_k$ | OFF |

where:

- l may or may not be equal to j+1 and i<j<l<k, where 'i' is an integer value equal to 0 or more.

The set of TC-RNTI values could be provided via higher-layer signaling (e.g., SIB1 or RMSI).

The set of TC-RNTI values could be indicated via a sub-set of specific TC-RNTI instances (e.g., considering the whole 16-bit sequence of TC-RNTI).

The set of TC-RNTI values can be indicated via a sub-set of N bits of the TC-RNTI field.

The sub-set of N bits could be given by the N Least Significant Bits, LSBs/Most Significant Bits, MSBs of the TC-RNTI field.

In one implementation, the set of TC-RNTI values could be also used to configure the number of Msg3 repetitions. A non-limiting example of this in provided in the below table, which shows an example of a hard-coded, or gNB-configured, set of TC-RNTI values with corresponding indicated number of Msg3 repetitions.

| Range of hard-coded, or gNB-provided, TC-RNTI values | Indicated number of Msg3 repetitions |
|---|---|
| $N_i$ to $N_j$ | $M_1$ |
| $N_l$ to $N_k$ | $M_2$ |
| $N_m$ to $N_n$ | $M_3$ |
| $N_o$ to $N_p$ | $M_4$ |

where:

$M_1$, $M_2$, $M_3$, $M_4$ denote number of repetitions corresponding to the pre-defined hard-coded TC-RNTI range;

$M_i>1$, $\forall i \in [1,4]$, or $M_i \geq 1$, $\forall i \in [1,4]$, i.e., the indication implicitly serves as Msg3 repetition trigger as well;

j+1 may or may not be equal to 1;

k+1 may or may not be equal to m; and n+1 may or may not be equal to o, where i is an integer value equal to 0 or more.

The same set or different sub-sets of values can be used to indicate the number of Msg3 repetitions A specific sub-set of m TC-RNTI values can be used to trigger Msg3 repetitions and configure a value for the number of Msg3 repetitions from a set containing m elements.

M LSBs/MSBs of the m TC-RNTI values can be used to trigger Msg3 repetitions and configure a value for the number of Msg3 repetitions among at least 2 M values.

The M LSBs/MSBs of the m TC-RNTI values can be used in conjunction with other indicators to configure more than 2 M values for the number of Msg3 repetitions.

The LSB/MSB of the TC-RNTI can be used to trigger the Msg3 repetitions, while the remaining M−1 bits of the TC-RNTI can be used to configure a value for the number of Msg3 repetitions among at least $2^{M-1}$ values by associating a range of values to a specific number of repetitions.

The M−1 LSBs/MSBs of the TC-RNTI can be used in conjunction with other indicators to configure more than $2^{M-1}$ values for the number of Msg3 repetitions.

Having different sub-sets may help provide false-alarm robustness.

In one implementation, the number of Msg3 repetitions could be configured via higher-layer signaling (e.g., via SIB1).

In one implementation, the number of Msg3 repetitions could be hard-coded in the specification.

In one implementation, the number of Msg3 repetition could be configured dynamically via other indicators provided to UE.

In one implementation, the gNB could provide, via higher-layer signaling, (e.g., SIB1), at least a flag to indicate that Msg3 repetitions are supported in the cell/by the gNB instructing the UE to repeat the Msg3 according to the received TC-RNTI. Remaining configuration on the use of TC-RNTI can be provided in SIB1 or other RMSI 2. Use a Set of TC-RNTI Values to at Least Configure the Number of Msg3 Repetitions According to this implementation, a set of TC-RNTI values is used to at least configure the number of Msg3 repetitions. Differently from the previous implementation, here the at least does not necessarily imply that Msg3 repetitions are also triggered via TC-RNTI (indeed they may or may not), but simply that further implicit signalling via TC-RNTI may take place together with the Msg3-related implicit signalling).

The set of TC-RNTI values could be a range of contiguous TC-RNTI values.

The set of TC-RNTI values could be hard-coded in the specs or configured by the gNB (an example, and by no means a unique possible example, is provided in the below table showing an example of sets of TC-RNTI values with corresponding indicated number of Msg3 repetitions:

| Set of hard-coded, or gNB-provided, TC-RNTI values | Indicated number of Msg3 repetitions: Exact number | Reference to otherwise indicated/specified values |
|---|---|---|
| $N_i$ to $N_j$ | 1 | No repetition |
| $N_l$ to $N_k$ | $M_1$ | Second value |
| $N_m$ to $N_n$ | $M_2$ | Third value |
| $N_o$ to $N_p$ | $M_3$ | Fourth value |

where:

j+1 may or may not be equal to 1, k+1 may or may not be equal to m, and n+1 may or may not be equal to o where i is an integer value equal to 0 or more.

In the above table, the range $N_i$ to $N_j$ is mapped to "no repetition". This could arguably be deemed to be a redundant configuration. However, representing a perfectly valid "Msg3 repetitions are not configured" case has been added for the sake of clarity, and logically a set of TC-RNTIs must map to a "no repetition" action, either explicitly or by not being included in any of the ranges that map to any of the repetition values larger than 1.

The set of TC-RNTI values could be provided via higher-layer signaling (e.g., SIB1 or RMSI).

The set of TC-RNTI values could be indicated via a sub-set of TC-RNTI instances (e.g., considering the whole 16-bit sequence).

The set of TC-RNTI values could be indicated via a sub-set of N bits of the TC-RNTI field. The sub-set of N bits could be given by the N LSBs/MSBs of the TC-RNTI field. The same set or different sub-sets of TC-RNTI values could be used to indicate the number of Msg3 repetitions. A specific sub-set of m TC-RNTI values could be used to configure a value for the number of Msg3 repetitions among at least m values.

M LSBs/MSBs of the TC-RNTI could be used to configure a value for the number of Msg3 repetitions among at least 2 M values. The M LSBs/MSBs of the TC-RNTI could be used in conjunction with other indicators to configure more than 2 M values for the number of Msg3 repetitions.

In one implementation, the gNB could provide, via higher-layer signaling (e.g., in SIB1 or RMSI), an indication, such as at least a flag, to indicate that Msg3 repetitions are supported in the cell/by the gNB. The remaining configuration on the use of TC-RNTI could be provided via higher-layer signalling, e.g., in SIB1 or RMSI

| Set of hard-coded, or gNB-provided, TC-RNTI values | Indicated number of Msg3 repetitions: Exact number | Reference to otherwise indicated/specified values |
|---|---|---|
| $N_i$ to $N_j$ | 1 | No repetition |
| $N_l$ to $N_k$ | $M_1$ | Second value |
| $N_m$ to $N_n$ | $M_2$ | Third value |
| $N_o$ to $N_p$ | $M_3$ | Fourth value |

Whist FIGS. 2, 5 and 6 show only a single UE and gNB, it is of course to be appreciated that in some examples there may be a plurality of UEs and gNBs (as well as one or more distributed gNBs each having a central unit, gNB-CU, and plural distributed units, gNB-DUs).

The signaling diagrams and flowcharts of FIGS. 2, 5 and 6 represent one possible scenario among others. The blocks illustrated in FIGS. 2, 5 and 6 are functional and the functions described may or may not be performed by a respective single physical entity (such as an apparatus described with reference to FIG. 7.

The blocks illustrated in FIGS. 2, 5 and 6 can represent actions in a method, and/or sections of instructions/code in a computer program (such as described with reference to FIG. 8).

It will be understood that each block and combinations of blocks, can be implemented by various means, such as hardware, firmware, and/or software including one or more computer program instructions. For example, one or more of the procedures described above can be embodied by computer program instructions. In this regard, the computer program instructions which embody the procedures described above can be stored by a memory storage device and performed by a processor.

As will be appreciated, any such computer program instructions can be loaded onto a computer or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using signaling diagrams, flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e., the software or firmware) thereon for performing by the computer processor.

Figure 7:
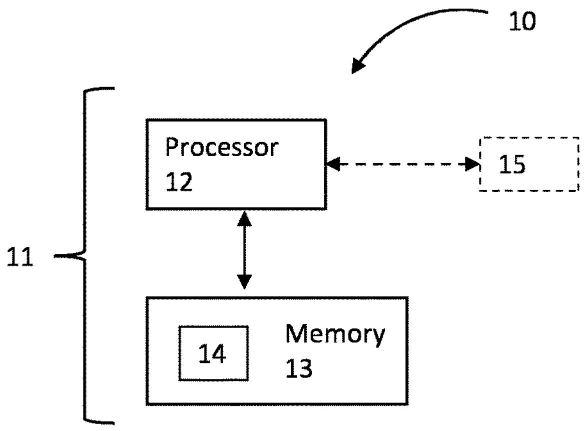
FIG. 7 shows another example of the subject matter described herein.

FIG. 7 schematically illustrates a block diagram of an apparatus 10 for performing the methods, processes, procedures and signalling described in the present disclosure and illustrated in FIGS. 2, 5 and 6. The component blocks of FIG. 7 are functional and the functions described may or may not be performed by a single physical entity.

The apparatus comprises a controller 11, which could be provided within a device such as a UE 110 or a gNB 120. The controller 11 can be embodied by a computing device, not least such as those mentioned above. In some, but not necessarily all examples, the apparatus can be embodied as a chip, chip set or module, i.e., for use in any of the foregoing. As used here 'module' refers to a unit or apparatus that excludes certain parts/components that would be added by an end manufacturer or a user.

Implementation of the controller 11 may be as controller circuitry. The controller 11 may be implemented in hardware alone, have certain aspects in software including firmware alone or can be a combination of hardware and software (including firmware).

The controller 11 may be implemented using instructions that enable hardware functionality, for example, by using executable instructions of a computer program 14 in a general-purpose or special-purpose processor 12 that may be stored on a computer readable storage medium 13, for example memory, or disk etc, to be executed by such a processor 12.

The processor 12 is configured to read from and write to the memory 13. The processor 12 may also comprise an output interface via which data and/or commands are output by the processor 12 and an input interface via which data and/or commands are input to the processor 12. The apparatus may be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and illustrated in FIGS. 2,5 and 6. The processor 12 by reading the memory 13 is able to load and execute the computer program 14.

Although the memory 13 is illustrated as a single component/circuitry it may be implemented as one or more separate components/circuitry some or all of which may be integrated/removable and/or may provide permanent/semi-permanent/dynamic/cached storage.

Although the processor 12 is illustrated as a single component/circuitry it may be implemented as one or more separate components/circuitry some or all of which may be integrated/removable. The processor 12 may be a single core or multi-core processor.

The apparatus may include one or more components for effecting the methods, processes and procedures described in the present disclosure and illustrated in FIGS. 2, 5 and 6. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a node of a network, a UE, a gNB, a RAN node, a gNB-CU, a gNB-DU. The apparatus can be a base station in a mobile cellular telecommunication system, a server device, a client device, a mobile cellular telephone, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e., for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In some examples, the apparatus 10 is provided in a UE 110, the apparatus comprising:
- at least one processor 12; and
- at least one memory 13 including computer program code
- the at least one memory 13 and the computer program code configured to, with
- the at least one processor 12, cause the apparatus at least to perform:
  - receiving an identifier, wherein the identifier is configured to signal control information and/or configuration information respectively for triggering performance of an action and/or configuring the UE;
  - determining, based at least in part on the received identifier, the control information and/or the configuration information; and
  - performing the action and/or configure the UE in accordance with the determined control and/or the determined configuration information.

Where the apparatus is implemented in a UE, the UE may be configured for one or more the following purposes:
- to provide periodic deterministic communication;
- to provide monitoring results for one or more industrial wireless sensors;
- to provide a node in the Industrial Internet of Things;
- to provide 3GPP ultra reliable low latency communication;
- to provide real-time sensor measurements;
- to provide a component of a transport automation system and/or;
- to provide a component of a factory automation system.

In some examples, the apparatus is provided in a radio access node 120, the apparatus comprising:
- at least one processor 12; and
- at least one memory 13 including computer program code
- the at least one memory 13 and the computer program code configured to, with
- the at least one processor 12, cause the apparatus at least to perform:
  - generating an identifier for a UE, wherein the identifier is configured to signal control information and/or configuration information respectively
  - for triggering performance of an action and/or configuring the UE; and causing sending of the identifier to the UE.

According to some examples of the present disclosure, there is provided a system comprising: a centralized unit, distributed unit and UE as described above.

The above described examples find application as enabling components of: telecommunication systems; tracking systems, automotive systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

Figure 8:
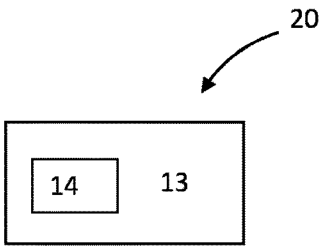
FIG. 8 shows another example of the subject matter described herein.

FIG. 8, illustrates a computer program 14. The computer program may arrive at the apparatus 10 via any suitable delivery mechanism 20. The delivery mechanism 20 may be, for example, a machine readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism may be a signal configured to reliably transfer the computer program. The apparatus 10 may receive, propagate or transmit the computer program as a computer data signal.

In certain examples of the present disclosure, there is provided computer program instructions for causing a distributed unit of an access node or a UE to perform at least the following or for causing performing at least the following:

receiving an identifier, wherein the identifier is configured to signal control information and/or configuration information respectively for triggering performance of an action and/or configuring the UE;

determining, based at least in part on the received identifier, the control information and/or the configuration information; and performing the action and/or configure the UE in accordance with the determined control and/or the determined configuration information.

In certain examples of the present disclosure, there is provided computer program instructions for causing a centralized unit of an access node to perform at least the following or for causing performing at least the following:

generating an identifier for a UE, wherein the identifier is configured to signal control information and/or configuration information respectively for triggering performance of an action and/or configuring the UE; and causing sending of the identifier to the UE.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry); and (b) combinations of hardware circuits and software, such as (as applicable):

(i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions; and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

References to a parameter can be replaced by references to "data indicative of", "data defining" or "data representative of" the relevant parameter if not explicitly stated.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

We claim:

1. A User Equipment, UE, comprising:

at least one processor; and at least one memory including computer program instructions, the at least one memory and the computer program instructions configured to, with the at least one processor, cause the UE at least to:

receive an identifier, wherein the identifier is configured to signal control information and/or configuration information respectively for triggering performance of an action and/or configuring the UE;

determine, based at least in part on the received identifier, the control information and/or the configuration information; and perform the action and/or configure the UE in accordance with the determined control and/or the determined configuration information, wherein the control information and/or the configuration information comprises:

information for triggering and/or configuring transmission of a message of a Random Access procedure;

information for triggering and/or configuring a number of repetitions of a message of a Random Access procedure;

information for triggering the UE to transmit a message a number of times;

information for configuring the UE to transmit a message a number of times; and information for indicating a number of times a message is to be transmitted, wherein the message is a Msg3 message, wherein at least one of said control information and/or configuration information is encoded in or associated with the received identifier such that the UE decodes the identifier and/or uses association information to determine whether Msg3 repetitions are triggered and/or a number of Msg3 transmissions, wherein the identifier comprises a Temporary Cell Radio Network Temporary Identifier, TC-RNTI, provided in a Medium Access Control Random Access Response, MAC RAR, and a TC-RNTI value is selected from a set or according to a bit-subset mapping to at least trigger Msg3 repetitions and/or indicate the number of Msg3 transmissions.

2. The UE of claim 1, wherein the received identifier comprises an identifier value that is associated with one of a plurality of pre-defined sets of identifier values, and the UE is configured to determine or receive association information identifying which set the received identifier value belongs to, wherein different sets are respectively associated with differing control and/or configuration information, including: a first set pre-associated with control information to trigger repeated transmission of Msg3, and a second set pre-associated with control information to trigger a single transmission of Msg3; wherein the UE determines the set by looking up a pre-stored codebook or by using received association information that associates value ranges with the first set and value ranges with the second set.

3. The UE of claim 1, wherein the association information comprises: pre-stored data in a memory of the UE specified in a standard and/or coded in a specification; information received in a dedicated configuration message; information received in system information via higher-layer signaling; and information received in downlink control information.

4. The UE of claim 1, wherein the identifier comprises:

an identifier received in a message of a random access procedure;

an identifier received in a Medium Access Control Protocol Data Unit, MAC PDU; and an identifier received in a Medium Access Control Random Access Response, MAC RAR.

5. The UE of claim 1, wherein the UE is configured to determine, by looking up in a pre-determined codebook pre-stored in a memory of the UE or receiving association information that associates each set of identifier values with a particular action to be triggered by associating a first set of identifier values with triggering repeated transmission of Msg3, and a second set of identifier values with triggering just a single transmission of Msg3, wherein the received identifier is a bitstring and is mapped to or pre-associated with the control information and/or the configuration information and the UE is configured to determine, based on a subset of bits of the bit sequence of the received identifier, the control information and/or the configuration information, and wherein each of the subset of bits of the identifier is associated with differing control information and/or configuration information, and the UE is configured to determine or receive association information for enabling the UE to determine which subset of bits of the identifier are associated with which differing control information and/or configuration information.

6. The UE of claim 1, wherein the received identifier encodes an indication of the control information and/or the configuration information, and wherein the UE is configured to:

decode the received identifier to extract the indication of the control information and/or the configuration information.

7. The UE of claim 1, wherein the received identifier is associated with the control information and/or the configuration information, wherein the received identifier is a bitstring and is mapped to or pre-associated with the control information and/or the configuration information, and wherein the UE is configured to:

determine or receive association information for enabling the UE to determine the control information and/or the configuration information associated with the at least part of the received identifier.

8. A method for a User Equipment, UE, the method comprising:

receiving an identifier, wherein the identifier is configured to signal control information and/or configuration information respectively for triggering performance of an action and/or configuring the UE;

determining, based at least in part on the received identifier, the control information and/or the configuration information; and performing the action and/or configure the UE in accordance with the determined control and/or the determined configuration information, wherein the control information and/or the configuration information comprises:

information for triggering and/or configuring transmission of a message of a Random Access procedure;

information for triggering and/or configuring a number of repetitions of a message of a Random Access procedure;

information for triggering the UE to transmit a message a number of times;

information for configuring the UE to transmit a message a number of times; and information for indicating a number of times a message is to be transmitted, wherein the message is a Msg3 message, wherein at least one of said control information and/or configuration information is encoded in or associated with the received identifier such that the UE decodes the identifier and/or uses association information to determine whether Msg3 repetitions are triggered and/or a number of Msg3 transmissions, wherein the identifier comprises a Temporary Cell Radio Network Temporary Identifier, TC-RNTI, provided in a Medium Access Control Random Access Response, MAC RAR, and a TC-RNTI value is selected from a set or according to a bit-subset mapping to at least trigger Msg3 repetitions and/or indicate the number of Msg3 transmissions.

9. The method of claim 8, wherein the control information and/or the configuration information comprises, at least one selected from a group of:

information for triggering and/or configuring transmission of a message of a Random Access procedure;

information for triggering and/or configuring a number of repetitions of a message of a Random Access procedure;

information for triggering the UE to transmit a message a number of times;

information for configuring the UE to transmit a message a number of times; and information for indicating a number of times a message is to be transmitted.

10. The method of claim 9, wherein the method further comprises the UE checking for receipt of an indicator and whether or not the UE determines the control information and/or the configuration information is based upon receipt of the indicator, wherein the indicator indicates to the UE whether it should expect the identifier to encode control and/or configuration information and whether the UE is to attempt to extract the control and/or configuration information and implement the control and/or configuration information, wherein the indicator comprises a flag or a dedicated message that informs the UE that encoded identifier feature/functionality is active in a cell currently serving the UE.

11. The method of claim 8, wherein the identifier comprises:

an identifier received in a message of a random access procedure;

an identifier received in a Medium Access Control Protocol Data Unit, MAC PDU; and an identifier received in a Medium Access Control Random Access Response, MAC RAR.

12. The method of claim 8, wherein the received identifier encodes an indication of the control information and/or the configuration information, and wherein the UE is configured to:

decode the received identifier to extract the indication of the control information and/or the configuration information.

13. The method of claim 8, wherein at least a part of the received identifier is associated with the control information and/or the configuration information, and wherein the UE is configured to:

determine or receive association information for enabling the UE to determine the control information and/or the configuration information associated with the at least part of the received identifier.

14. A non-transitory computer readable medium encoded with instructions that, when performed by at least one processor, causes at least the following to be performed:

receiving an identifier, wherein the identifier is configured to signal control information and/or configuration information respectively for triggering performance of an action and/or configuring the UE;

determining, based at least in part on the received identifier, the control information and/or the configuration information; and performing the action and/or configure the UE in accordance with the determined control and/or the determined configuration information, wherein the control information and/or the configuration information comprises:

information for triggering and/or configuring transmission of a message of a Random Access procedure;

information for triggering and/or configuring a number of repetitions of a message of a Random Access procedure;

information for triggering the UE to transmit a message a number of times;

information for configuring the UE to transmit a message a number of times; and information for indicating a number of times a message is to be transmitted, wherein the message is a Msg3 message, wherein at least one of said control information and/or configuration information is encoded in or associated with the received identifier such that the UE decodes the identifier and/or uses association information to determine whether Msg3 repetitions are triggered and/or a number of Msg3 transmissions, wherein the identifier comprises a Temporary Cell Radio Network Temporary Identifier, TC-RNTI, provided in a Medium Access Control Random Access Response, MAC RAR, and a TC-RNTI value is selected from a set or according to a bit-subset mapping to at least trigger Msg3 repetitions and/or indicate the number of Msg3 transmissions.

15. The non-transitory computer readable medium of claim 14, wherein the identifier comprises:

an identifier received in a message of a random access procedure;

an identifier received in a Medium Access Control Protocol Data Unit, MAC PDU; and an identifier received in a Medium Access Control Random Access Response, MAC RAR.

16. The non-transitory computer readable medium of claim 14, wherein the received identifier encodes an indication of the control information and/or the configuration information, and wherein the UE is configured to:

decode the received identifier to extract the indication of the control information and/or the configuration information.

* * * * *